United States Patent [19]

Frisch et al.

[11] Patent Number: 4,677,029
[45] Date of Patent: Jun. 30, 1987

[54] VAPOR-PHASE CURE OF COATING COMPOSITIONS CONTAINING AN ALIPHATIC POLYISOCYANATE AND A TERTIARY AMINE POLYAHL

[75] Inventors: Kurt C. Frisch, Grosse Ile; Hiong X. Xiao, Oak Park; Taki J. Anagnostou, Livonia, all of Mich.

[73] Assignee: Akzo America Inc., New York, N.Y.

[21] Appl. No.: 800,479

[22] Filed: Nov. 21, 1985

[51] Int. Cl.$^4$ .................. B05D 3/02; B32B 27/00; B32B 27/40
[52] U.S. Cl. .................. 428/423.1; 427/340; 427/388.2; 427/393; 427/393.5; 428/425.1; 428/425.8; 528/78; 528/82
[58] Field of Search .................. 427/340, 388.2, 393, 427/393.5; 528/78, 82; 428/423.1, 425.1, 425.8

[56] References Cited

U.S. PATENT DOCUMENTS 4,396,647  8/1983  Linden .................. 427/340

Primary Examiner—Michael R. Lusignan
Attorney, Agent, or Firm—Jeffrey S. Boone; Francis W. Young

[57] ABSTRACT

An aliphatic isocyanate (such as the biuret of 1,6-diisocyanatohexane) is combined with a tertiary amine polyahl (such as a tertiary amine polyol) and coated onto a substrate. The coated substrate is then exposed to the vapor of a urethane catalyst for curing to a tack-free state. This process permits the preparation of coatings which will cure rapidly and which are light stable. These coatings have utility in the field of automotive topcoats.

19 Claims, No Drawings

VAPOR-PHASE CURE OF COATING COMPOSITIONS CONTAINING AN ALIPHATIC POLYISOCYANATE AND A TERTIARY AMINE POLYAHL

BACKGROUND OF THE INVENTION

This invention relates to vapor-phase curable coating compositions employing aliphatic polyisocyanates.

In the field of industrial coatings, particularly in the automotive industry, the speed and ease of application and cure are extremely important. It is for this reason that paint manufacturers have sought an industrial coating system that can be easily applied and which is capable of an easy and rapid cure to a tack-free state. One recent attempt at a workable system is the use of a vapor-phase catalyst to cure a coating composition. In the typical practice of such a system, a substrate is coated with a composition containing an aromatic polyisocyanate and a polyhydroxyl compound (polyol), and the coated substrate is then exposed to the vapor of a "urethane" catalyst, typically a tertiary amine.

Although these vapor-phase curable coating compositions are easy to apply and easy to cure, they have a serious shortcoming. Their practice requires the use of an aromatic polyisocyanate, because the use of an aliphatic isocyanate will increase the cure time to several hours. Unfortunately, however, aromatic polyisocyanates, unlike their aliphatic counterparts, cause yellowing in the ultimate cured finish when exposed to ultraviolet light. Thus, they are totally unacceptable for use in applications that cannot tolerate changes in color after cure.

Considering specific prior art, U.S. Pat. No. 3,874,898 is relevant in that it teaches vehicles, including primarily printing inks, but also including surface coatings, containing a polyisocyanate and a polyol, which is cured by use of an amine vapor.

U.S. Pat. No. 4,343,924 and four related patents, U.S. Pat. Nos. 3,822,226; 3,789,044; 3,836,491; and GB No. 1,351,881 (all five of which are assigned to Ashland Oil) all relate to coatings containing an isocyanate and a polyol, which are cured by a vapor catalyst. Although some of these four patents mention that the use of functionally substituted amines such as dimethyl ethanol-amine (a mono-ol) is not outside their claim scope, they also teach that tertiary amines containing active hydrogen are less preferred because of their potential reaction with the isocyanate. Further, U.S. Pat. No. 4,343,924 explicitly states that aromatic isocyanates are necessary in order to obtain a desired rapid reaction in the presence of the vaporous tertiary amine catalysts at room temperature.

U.S. Pat. Nos. 3,892,713 and 4,143,009 both discuss isocyanate systems having a tertiary amine polyol, but these patents do not involve vapor phase curing.

BE Nos. 876,906 and 876,907 both teach foundary binders which employ an aromatic amine polyol, and which are cured by a vapor catalyst. However, these compositions are intended to be easily broken into fragments, and therefore would not be suitable as coating compositions. The above-mentioned coating patents to Ashland Oil also teach that foundary binders are not generally suitable for use in coating compositions. Further, these two foundary binder patents teach a preference for aromatic isocyanates.

Therefore, it would be desirable to have a vapor-phase curable urethane coating composition employing an aliphatic isocyanate, which could cure generally as fast as an aromatic isocyanate system, but which would not suffer from the yellowing inherent in such systems.

SUMMARY OF THE INVENTION

In one aspect, the invention is a method of curing a urethane coating composition comprising coating a substrate with a composition made from an aliphatic polyisocyanate and a tertiary amine polyahl, and then contacting the coated substrate with the vapor of a urethane catalyst. In another aspect, the invention is the cured, coated substrate produced by the preceding method.

The instant invention permits the use of an aliphatic isocyanate, so that the yellowing problem associated with aromatic isocyanates is not present. It further permits extremely rapid cure times compared to the impractically long cure times normally associated with the vapor-phase curing of aliphatic isocyanates. Although the invention has utility in many diverse applications, it is particularly advantageous in the field of automotive topcoat finishes.

DETAILED DESCRIPTION OF THE INVENTION

Unless otherwise stated, the numerical limitations used herein are not critical. That is, they may be read as if prefaced with the term "about" or "substantially".

One essential component of the invention is an aliphatic polyisocyanate. The precise character of the aliphatic polyisocyanate is not critical, and generally, any aliphatic polyisocyanate which is suitable for use in other urethane coatings will be suitable for use in the instant invention.

The polyisocyanate may be a simple aliphatic compound terminated with two or more isocyanate moieties, such as a $C_4$ to $C_{12}$, preferably a $C_5$ to $C_8$ diisocyanate, for example, 1,6-hexamethylene diisocyanate (1,6-diisocyanatohexane) and adducts thereof.

Another class of suitable polyisocyanates are cycloaliphatic isocyanates such as 1,3-diisocyanatomethyl-3,5,5-trimethylcyclohexane (also known as isophorone diisocyanate) and various isomers of dicyclopentadiene diisocyanate.

Another class of suitable polyisocyanates includes the biurets of aliphatic (e.g., $C_4$ to $C_{12}$, especially $C_5$ to $C_8$) diisocyanates, such as the biuret of 1,6-diisocyanatohexane. This class is especially preferred because of its low cost, ready availability, and excellent performance.

Yet another suitable form of the aliphatic polyisocyanate is that of a polymer of an ethylenically unsaturated isocyanate. Suitable polymers include those of isocyanatoalkyl esters of ethylenically unsaturated carboxylic acids, especially those of 2-isocyanatoethyl methacrylate.

Furthermore, the practice of the invention includes the use of aliphatic isocyanates attached to an aromatic ring. Isocyanate compounds having both aliphatic and aromatic character have long reaction times in conventional vapor-cure systems (similar to compounds of entirely aliphatic character), but their performance is improved in the practice of the invention, and they are within the scope of the invention. Such compounds may be virtually any compound having an aromatic ring and more than one isocyanate moiety, where the isocyanate moieties are separated from the aromatic ring by at least one carbon atom. Preferably, any such aliphatic aromatic isocyanate will have a structure according to the formula;

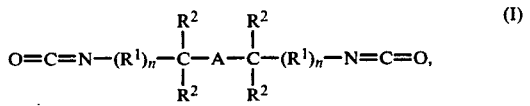

wherein A is an organic radical including at least one aromatic ring, desirably an aromatic ring having from six to twelve members forming the ring, preferably an aromatic ring having six carbon atoms forming the ring; each $R^1$ is independently an aliphatic radical, desirably an aliphatic radical having from one to six carbon atoms, preferably an aliphatic radical having one to three carbon atoms; each n is independently zero or one, preferably zero; and each $R^2$ is independently an organic or inorganic radical, desirably a hydrogen, a halogen or an aliphatic radical having from one to six carbon atoms, preferably an aliphatic radical having one to three carbon atoms, and more preferably a methyl radical. In a particularly preferred embodiment, the aliphatic aromatic isocyanate is 1,4-bis(1-isocyanato-1-methylethyl) benzene (an alternative name is p-$\alpha,\alpha,\alpha'\alpha'$-tetramethyl-$\alpha,\alpha'$-diisocyanatoxylene). In a most preferred embodiment, the aliphatic aromatic isocyanate is 1,3-bis(1-isocyanato-1-methylethyl)benzene (an alternative name is m-$\alpha,\alpha,\alpha'\alpha'$-tetramethyl-$\alpha,\alpha'$-diisocyanatoxylene), which is shown by the following formula:

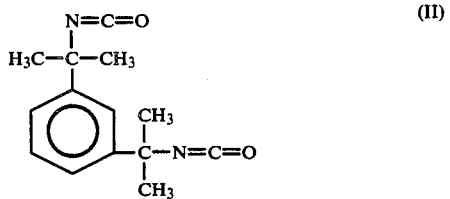

Methods for the production of such compounds are summarized in U.S. Pat. No. 4,465,713.

Another component of the invention is a tertiary amine polyahl. By the term "polyahl" is meant a polyfunctional compound having an average greater than 1 active hydrogen moiety which displays significant activity according to the Zerewitinoff test described by Woller in the *Journal of American Chemical Society*, Vol. 49, Page 3181 (1927). Specifically included within the definition of polyahls are polyols, polyamines, polyamides, and polymercaptans. Also specifically included are compounds having more than one -SeH or -TeH group. Further, suitable compounds may be those with active hydrogens supplied by more than one type of active hydrogen moiety. Examples of these compounds include amino alcohols and mercapto alcohols. Importantly, suitable polyahls also specifically include those compounds having three or more active hydrogens per molecule. The ready availability, low cost, and predictable performance of polyols make them extremely preferred for use in the invention.

The tertiary amine polyahl must contain in its molecule at least one tertiary amine nitrogen. While in some species, each active hydrogen moiety may be attached to a separate tertiary amine nitrogen, other species will employ only a single tertiary amine nitrogen.

The structure of the tertiary amine polyahl may be quite varied. The active hydrogen moieties may be connected to the tertiary amine nitrogen only by hydrocarbon moieties, or the linkage may include other moieties such as ether groups. The molecule may contain a cyclic moiety. Although not preferred, the molecule may be aromatic. If it is aromatic, it is desirable to have the tertiary amine nitrogen separated from the aromatic structure by at least one carbon atom.

In general, the tertiary amine polyahl will have the structure:

wherein n=2 or 3 (preferably 2), and n+m=3, A is an active hydrogen moiety (preferably hydroxyl), and $R^1$ and $R^2$ are each independently organic moieties. $R^1$ and $R^2$ may be part of long polymeric chains, or may be the result of an oligomer polymerization (for instance, several polyether units). It is preferred that each $R^2$ have at least two carbon atoms, and that the entire molecule have at least 5, more preferably at least 6, still more preferably, at least 7, and most preferably at least 8 carbon atoms. Although, as mentioned, each $R^1$ and $R^2$ may be part of a long polymeric chain, it is preferred that the entire molecule not have more than 60 carbon atoms. Further, except in those instances where $R^2$ is a polyether moiety, it is preferred that there not be more than 3, preferably not more than 2 carbon atoms between the active hydrogen and the tertiary amine nitrogen.

In a preferred embodiment, the tertiary amine polyahl has the structure:

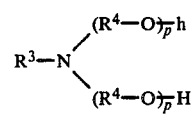

wherein each p is independently from 1 to 40, preferably from 1 to 20, most preferably from 2 to 20, $R^3$ is an organic moiety having from 1 to 40, desirably from 2 to 40, more desirably from 3 to 40, preferably from 4 to 40, and most preferably from 5 to 40 carbon atoms, and each $R^4$ is independently an organic moiety having from 2 to 4, preferably 2 or 3 carbon atoms.

The following structures are representative of compounds which are suitable for use as the tertiary amine polyahl.

A compound with the structure

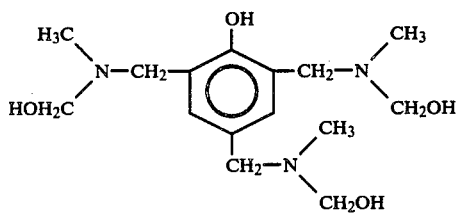

is sold under the tradename R-350-X by Texaco Company.

A compound with the structure

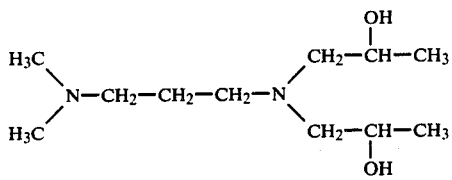

is sold under the trade name Than-Cat DPA by Air Products Company.

A series of compounds having the structure

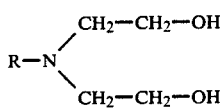

wherein R is
  coconut oil derivative acids (e.g., $CH_3(CH_2)_{11}$): (Ethomeen C/12)
  tallow derivative acids (e.g., $CH_3(CH_2)_{17}$): (Ethomeen T/12)
  oleic derivative acids (e.g., $CH_3(CH_2)_7CH=CH(CH_2)_8$): (Ethomeen 0/12)
  soya oil derivative acids: (Ethomeen S/12)
are sold under the Ethomeen tradename by Akzo Chemie America.

A series of chemicals having the structure

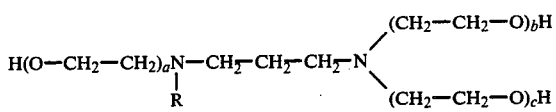

wherein
  $R=CH_3(CH_2)_{17}$ and $a+b+c=3$ (Ethoduomeen T/13)
  $R=CH_3(CH_2)_{17}$ and $a+b+c=15$ (Ethoduomeen T/25)
are sold under the Ethoduomeen Tradename by Akzo Chemie America.

A series of compounds having the formula

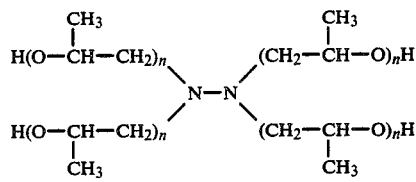

wherein
  $n=2$ (Oxypruf 6)
  $n=3$ (Oxypruf 12)
  $n=5$ (Oxypruf 20)
is sold by Owen Chemical Company by the name of Oxypruf.

A series of compounds having the structure

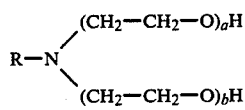

wherein

R is a tallow fatty acid derivative (e.g., $CH_3-(CH_2)_{17}$), and
  $a+b=8$ (Trymeen TAM-8)
  $a+b=15$ (Trymeen TAM-15)
  $a+b=20$ (Trymeen TAM-20)
  $a+b=25$ (Trymeen TAM-25)
  $a+b=40$ (Trymeen TAM-40)
is sold under the Trymeen tradename by Emory Industries.

A series of compounds having the structure

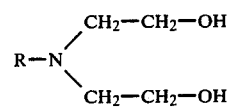

wherein

| R = $-CH_3$ | (N—MDEA) |
| $-CH_2-CH_3$ | (N—EDEA) |
| $-CH(CH_3)_2$ | (N—IPDEA) |
| $-CH(CH_3)_3$ | (N—tBDEA) | which are N-alkyldiethanolamines are sold by Pennwalt Chemical Company.

The tertiary amine polyahls may be used in the form of a single pure compound or may be mixed with other tertiary amine polyahls. Indeed, some tertiary amine polyahls (particularly those which are least preferred) are used preferably in combination with other polyahls. For instance, triethanolamine (not a preferred species), if used alone, will cause the film to be rather brittle. However, if used with another tertiary amine polyahl having "softer" characteristics, the film can be formulated to be non-brittle.

Further, the tertiary amine polyahls may be blended with polyahls which do not contain a tertiary amine. While this may result in a slower cure speed, it may have the advantage of a lower raw material cost, or the ability to impart another desired property to the film. Since only about a 30 to 50% cure is needed to produce a film which is tack-free, a large portion of the polyahl component may be polyahl which does not contain a tertiary amine nitrogen. Generally, the polyahl portion of the coating composition will contain desirably at least 20%, preferably at least 30%, and most preferably at least 40% by weight tertiary amine nitrogen containing polyahl.

When formulating coatings according to the invention, the polyisocyanate and polyahl should be present in a ratio such that they are capable of being reacted with one another to form a substantially solid material. Since suitable polyisocyanates and polyahls specifically include those compounds having three or more active moieties per molecule, it is important, in defining the reaction ratios, to specify whether equivalent ratios or molecular ratios are being used. It is generally desirable, from a toxicological standpoint, to have a slight excess of active hydrogen moiety. While slight excesses of one component (for example, up to ten equivalent percent excess) are not unduly harmful to coating properties, it is preferable to have about one equivalent of isocyanate for each equivalent of active hydrogen.

As with other vapor-phase cure coating compositions, the coating compositions of this invention may contain a variety of optional components including stabilizers, anti-oxidants, plasticizers, leveling aids, anti-foulant compounds, dyes, pigments, lubricants, etc.

In one advantageous embodiment, the coating composition contains less —NCO than —OH functionality, and has a melamine compound (such as melamine, hexamethylolmelamine, or a resin prepared therefrom) present. For instance, 20–40 equivalent % of the —NCO may be replaced by melamine equivalent. There should, however, be sufficient —NCO present to enable a tack-free cure from the urethane catalyst vapor. The —NCO and —OH can react in the catalyst vapor chamber, and the remaining —OH can react with the melamine compound when subjected to heat (for instance, 40°–200° C., preferably 60°–150° C.). This embodiment provides finishes with exceptional durability.

The coating composition may be applied to the substrate by any conventional means, including spraying, dipping, brushing, rolling, and wire drawing. Although many of the components of the coating composition may be liquid at room temperature, those which are solids may be dissolved in any conventionally suitable solvent. Further, it may be desirable to dissolve liquid components in a solvent for viscosity control and ease of application. Suitable solvents include butylacetate, oxo-nonylacetate, methylacetate, toluene, methylisobutylketone, dioxane, xylene, methylethylketone, 2-nitropropane, acetone, hexylacetate, Cellosolve ® acetate, diisoamylketone, cyclohexane, ethylacetate, oxomonoacetate, oxo-decylacetate, and oxo-octylacetate.

The substrate itself may be any substrate which may be coated with a conventional coating. Of course, the substrate should not be incompatible with any of the solvents used in the composition. Preferred substrates are wood, metal, and synthetic polymers.

The coated substrate is contacted with the vapor of a urethane catalyst. By the term "urethane catalyst" is meant a compound which is capable of catalyzing an isocyanate/polyahl reaction. Suitable catalysts include tertiary amines, such as dimethylethylamine, diethylmethylamine, triethyl amine, tripropyl amine, etc. The catalyst desirably has a room temperature vapor pressure such that a sufficient quantity of catalyst will be present to catalyze the isocyanate/active hydrogen reaction. Alternatively, the catalyst may be dissolved in a solvent and heated to cause vaporization of the catalyst. The catalyst is desirably present in the atmosphere of the chamber at 1,000–10,000 ppm, preferably 3,000–5,000 ppm, by weight. The coated substrate is contacted with the catalyst vapor for a period of generally not more than 30 minutes, desirably not more than 10 minutes, more desirably not more than 4 minutes, preferably not more than 2 minutes, more preferably not more than 1 minute, and most preferably not more than 30 seconds. At the end of the contact time, the coating might not be fully cured and may still be somewhat soft. However, the coating should be tack-free. That is, it should not be sticky or adherent to an object placed lightly against it.

One advantage of the practice of the invention involves the ability to use a particularly advantageous catalyst. It is conventional in vapor phase curing technology to use dimethylethylamine as the vapor catalyst. However, although this catalyst produces fast reactions, it has severe pollution problems associated with it. Triethylamine is much better from a pollution standpoint, but performs rather slowly in conventional reactions. However, it has been found that triethylamine performs at a very fast rate in the instant invention, and still does not produce the pollution problems associated with dimethylethylamine. Therefore, it is a preferred catalyst species.

The coatings produced by the method of this invention have excellent qualities, including gloss, hardness, adhesion, solvent resistance, and light stability. Their excellent qualities make them suitable even for demanding applications such as automotive topcoat finishes.

The following examples further illustrate the invention.

In the examples, all parts are by weight. All determinations of free isocyanate remaining were made by infra-red analysis.

Desmodur N-75 is a 75% solution in ethylene glycol ethylacetate of an adduct of 3 moles of 1,6-hexamethylene diisocyanate and 1 mole of water. Desmodur N-100 is the same as Desmodur N-75, except that it does not have the solvent present. Desmodur Z-4370 is a prepolymer of isopherone diisocyanate. The Desmodur products are produced by Mobay. AU 608 is a hydroxy acrylic oligomer, not having a tertiary amine nitrogen, produced by Rohm & Haas. The other trademarked chemicals are discussed above.

EXAMPLE 1

The following ingredients were mixed well in an open container:
  Desmodur N-75—100 parts
  Ethomeen T/12—68.6 parts
  Butylacetate—118.6 parts The composition was spray applied to a cold rolled steel panel at a thickness of 25–30 μm and immediately placed in a chamber of triethylamine vapor. Within 4 minutes, 94% of the free isocyanate groups present had reacted.

EXAMPLE 2

The following ingredients were mixed well in an open container:
  Desmodur N-100—190 parts
  R-350-X—106 parts
  p-xylene—296 parts The composition was spray applied to a cold rolled steel panel at a thickness of 25–30 μm and immediately placed in a chamber of triethylamine vapor. Within 4 minutes, 36% of the free isocyanate groups had reacted.

EXAMPLE 3

The following ingredients were mixed well in an open container:
  m-xylene diisocyanate—94 parts
  Trymeen TAM-8—300 parts
  butylacetate—394 parts The composition was spray applied to a cold rolled steel panel at a thickness of 25–30 μm and immediately placed in a chamber of triethylamine vapor. Within 4 minutes, no free isocyanate groups could be detected.

EXAMPLE 4

The following ingredients were mixed well in an open container:
  Desmodur X-4370—350 parts
  AU 608—500 parts
  Ethomeen T/12—87.5 parts
  butylacetate—537 parts The composition was spray applied to a cold rolled steel panel at a thickness of 25–30 μm and immediately placed in a chamber of triethylamine vapor. Within 4 minutes, 71% of the free isocyanate groups had reacted.

This experiment was altered and further data collected. The results are shown in Table 1. In Table 1, ratios and percent reactions are expressed by equivalents. Other values are expressed by weight parts. A similar experiment using Desmodur N-75 as the polyisocyanate yielded similar results (slightly (0-5%) more —NCO reaction).

TABLE 1

|  | Sample: | | | |
| --- | --- | --- | --- | --- |
|  | 4A* | 4B | 4C | 4D |
| (1) Ratio AU 608:T/12 | 100:0 | 50:50 | 30:70 | 0:100 |
| AU 608 | 1000 | 500 | 300 | 0 |
| Ethomeen T/12 | 0 | 87.5 | 122.5 | 175 |
| Desmodur Z-4370 | 350 | 350 | 350 | 350 |
| (1) Ratio NCO/OH | 1/1 | 1/1 | 1/1 | 1/1 |
| % Reaction | | | | |
| 2 minutes | 7.1 | 47.1 | 68 | 90 |
| 4 minutes | 11.4 | 70.5 | 78.5 | 97 |
| 6 minutes | 14.3 | 78 | 80 | 98 |

*Not an example of the invention.
(1) Equivalent ratio.

These data show that the process of the invention (Samples 4B-4D) yields a greatly improved cure time, compared to a process not using a tertiary amine polyahl (Sample 4A).

We claim:

1. A method of curing a urethane coating composition comprising
   (a) coating a substrate with a composition comprising
      (i) an aliphatic polyisocyanate and
      (ii) a tertiary amine polyahl; and
   (b) contacting the coated substrate with the vapor of a urethane catalyst wherein said polyisocyanate and said polyahl are present in effective amounts so as to increase the tendency of the coating to reach a tack-free state when treated with said catalyst.

2. The method of claim 1 wherein the duration of contact of the coated substrate with the catalyst is not more than 30 minutes.

3. The method of claim 2 wherein the duration of contact is not more than 4 minutes.

4. The method of claim 1, 2, or 3 wherein at the conclusion of the contact of the coated substrate with the catalyst, the coating composition is tack-free.

5. The method of claim 1 wherein the polyahl has the structure

wherein n=2 or 3, n+m=3, A is an active hydrogen, and R¹ and R² are each independently organic moieties.

6. The method of claim 5 wherein n=2, A is hydroxyl, and the entire molecule has at least 7 and not more than 60 carbon atoms.

7. The method of claim 1 wherein the tertiary amine polyahl has the structure:

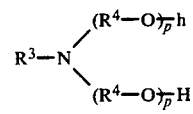

wherein each p is independently from 1 to 40, $R^3$ is an organic moiety having from 1 to 40 carbon atoms, and each $R^4$ is independently an organic moiety having 2 to 4 carbon atoms.

8. The method of claim 7 wherein each p is from 2 to 20, $R^3$ has from 5 to 40 carbons atoms, and each $R^4$ has 2 or 3 carbon atoms.

9. The method of claim 1 wherein the polyisocyanate contains no aromatic moieties.

10. The method of claim 9, wherein the polyisocyanate is a biuret of one or more aliphatic isocyanates.

11. The method of claim 1 wherein the polyisocyanate contains an aromatic ring separated from the isocyanate moieties by at least 1 carbon atom.

12. The method of claim 1 wherein the catalyst is a tertiary amine.

13. The method of claim 11 wherein the tertiary amine is triethylamine.

14. The method of claim 1 wherein said composition further comprises a melamine compound, and said contacting step is followed by a step of subjecting the coated substrate to an elevated temperature.

15. The method of claim 1 wherein the substrate is a physically coherent substrate.

16. The method of claim 14, wherein the substrate is wood, metal, or a synthetic polymer.

17. The method of claim 1, wherein the tertiary amine polyahl is present at at least 20% by weight, based on the total polyahl content of the composition.

18. The method of claim 16, wherein the tertiary amine polyahl is present at at least 40% by weight, based on the total polyahl content of the composition.

19. The cured, coated substrate produced by the method of claim 1.

* * * * *